US012564535B2

(12) United States Patent
Liu et al.

(10) Patent No.: US 12,564,535 B2
(45) Date of Patent: Mar. 3, 2026

(54) AIR COMPRESSION DEVICE

(71) Applicant: SHENZHEN DONGJILIAN MEDICAL TECHNOLOGY CO., LTD., Shenzhen (CN)

(72) Inventors: Zhuang Liu, Shenzhen (CN); Yongping Wang, Shenzhen (CN); Hong Zhang, Shenzhen (CN)

(73) Assignee: SHENZHEN DONGJILIAN MEICAL TECHNOLOGY CO., LTD., Shenzhen (CN)

( * ) Notice: Subject to any disclaimer, the term of this patent is extended or adjusted under 35 U.S.C. 154(b) by 1010 days.

(21) Appl. No.: 17/706,617

(22) Filed: Mar. 29, 2022

(65) Prior Publication Data

US 2022/0218558 A1 Jul. 14, 2022

(30) Foreign Application Priority Data

Dec. 30, 2021 (CN) ......................... 202111649794.0

(51) Int. Cl.
*A61H 9/00* (2006.01)

(52) U.S. Cl.
CPC ......... *A61H 9/0078* (2013.01); *A61H 9/0092* (2013.01); *A61H 2205/10* (2013.01)

(58) Field of Classification Search
CPC .... A61H 9/0078; A61H 9/0092; A61H 9/005; A61H 9/00; A61H 2205/10; A61H 2209/00
See application file for complete search history.

(56) References Cited

U.S. PATENT DOCUMENTS

| | | | | |
|---|---|---|---|---|
| 7,591,796 B1 * | 9/2009 | Barak | .................. | A61H 9/0078 601/152 |
| 2006/0149176 A1 * | 7/2006 | Bolam | ................. | A61H 9/0078 601/150 |

(Continued)

FOREIGN PATENT DOCUMENTS

| | | |
|---|---|---|
| CN | 108743288 A | 11/2018 |
| CN | 110464620 A | 11/2019 |

(Continued)

OTHER PUBLICATIONS

Machine translation of written description and claims for CN213490322U via google patents (Year: 2020).*

(Continued)

*Primary Examiner* — Bradley H Philips
*Assistant Examiner* — Tyler A Raubenstraw
(74) *Attorney, Agent, or Firm* — The Sun IP Law

(57) ABSTRACT

An air compression device includes a bottom shell, a top shell arranged at a top portion of the bottom shell, and a solenoid valve assembly. A handle hole is on one side of the top shell. The solenoid valve assembly includes solenoid valves. A row of control air passages is disposed on a top portion of the solenoid valve air distribution bracket. The row of control air passages includes first control air passages disposed on a middle portion of the row of control air passages and second control air passages on two sides of the row of control air passages. The first control air passages are communicated with a first row of working air passage. The second control air passages are communicated with a second row of working air passages. The solenoid valves are disposed on the row of control air passages.

9 Claims, 4 Drawing Sheets

(56) References Cited

U.S. PATENT DOCUMENTS

| | | | | |
|---|---|---|---|---|
| 2006/0161081 | A1* | 7/2006 | Barak | A61F 5/012 601/151 |
| 2008/0188781 | A1* | 8/2008 | Carkner | A61H 9/0078 601/149 |
| 2008/0262399 | A1* | 10/2008 | Kovelman | A61H 9/0078 601/152 |
| 2008/0294075 | A1* | 11/2008 | Nozzarella | A61H 31/006 601/44 |
| 2012/0089063 | A1* | 4/2012 | Olson | A61H 9/0078 601/152 |
| 2012/0109030 | A1* | 5/2012 | Mros | A61H 1/008 601/152 |
| 2013/0109913 | A1* | 5/2013 | Imboden | A61H 23/0218 600/38 |
| 2013/0253383 | A1* | 9/2013 | Maxon-Maldonado | A61H 9/0078 601/15 |
| 2013/0331752 | A1* | 12/2013 | Vess | A61H 9/0092 602/13 |
| 2014/0018637 | A1* | 1/2014 | Bennett | H04L 43/0817 607/51 |
| 2014/0249455 | A1* | 9/2014 | Parish | A61H 1/006 601/22 |
| 2015/0057585 | A1* | 2/2015 | Ladd | A61H 9/0078 601/149 |
| 2015/0094629 | A1* | 4/2015 | Crowley | G05D 7/0676 601/149 |
| 2015/0216760 | A1* | 8/2015 | Adams | A61H 9/0078 601/152 |
| 2015/0224012 | A1* | 8/2015 | Wright | A61H 9/0078 601/150 |
| 2016/0058654 | A1* | 3/2016 | Denson | A61H 9/0092 601/150 |
| 2016/0100793 | A1* | 4/2016 | Barak | A61B 5/4519 600/301 |
| 2016/0374886 | A1* | 12/2016 | Wyatt | A61N 1/3603 601/18 |
| 2016/0374891 | A1* | 12/2016 | Malhi | A61H 9/0092 601/151 |
| 2020/0113773 | A1* | 4/2020 | Ramanan | A61H 9/0078 |
| 2020/0121545 | A1* | 4/2020 | Parker, Sr. | A61H 9/0078 |
| 2020/0138665 | A1* | 5/2020 | Binversie | A61F 7/02 |
| 2020/0276077 | A1* | 9/2020 | Chiu | A61H 9/0007 |
| 2020/0289361 | A1* | 9/2020 | Tian | A61H 9/0092 |
| 2020/0390641 | A1* | 12/2020 | Arthurs | B60N 2/976 |
| 2021/0251842 | A1* | 8/2021 | Ramanan | A61H 9/0078 |
| 2021/0275390 | A1* | 9/2021 | Hsueh | A61H 9/0078 |

FOREIGN PATENT DOCUMENTS

| | | | | | |
|---|---|---|---|---|---|
| CN | 213490322 | U | * | 6/2021 | |
| CN | 219230622 | U | | 6/2023 | |
| KR | 20150061804 | A | * | 6/2015 | A61H 9/0057 |
| KR | 101888918 | B1 | | 8/2018 | |
| KR | 20200104514 | A | * | 9/2020 | F16K 31/06 |
| WO | WO-2020185199 | A1 | * | 9/2020 | A61H 9/0092 |

OTHER PUBLICATIONS

Machine translation of written description and claims for KR20150061804A via google patents (Year: 2015).*

Machine translation of written description and claims for KR20200104514A via google patents (Year: 2020).*

The First search report of counterpart CN application No. 2021116497940 issued on Nov. 4, 2024.

The First Office Action of counterpart CN application No. 2021116497940 issued on Nov. 8, 2024.

* cited by examiner

AIR COMPRESSION DEVICE

TECHNICAL FIELD

The present disclosure relates to a field of leg massagers with air compression, and in particular to an air compression device.

BACKGROUND

After surgery, patients often need to stay in bed for rest. It is inconvenient to exercise after surgery, but if a patient lacks exercise after surgery, it is easy to have limb weakness, and even cause complications, which leads to thrombosis. In order to prevent this, patients generally use a pressure massage device to massage limbs. An air pressure physiotherapy instrument mainly applies circulatory pressure on the limbs and tissues by repeatedly inflating and deflating multi-chamber airbags, and evenly and orderly squeezes distal ends of the limbs to proximal ends of the limbs, thereby promoting blood circulation, improving microcirculation in the body, accelerating return of limb tissue fluid, preventing formation of thrombosis and preventing limb edema. Therefore, the air pressure physiotherapy instrument directly or indirectly treats many diseases related to blood and lymph circulation. The air pressure physiotherapy instrument generally comprises a host, massaging sleeves and a connecting pipe. An air compression leg massager is an air pressure physiotherapy instrument for treatment of legs and feet. Air compression leg massagers on the market are generally heavy and bulky, which are inconvenient to use.

SUMMARY

An object of the present disclosure is to provide an air compression device to solve a problem that a conventional host of an air compression leg massager is heavy and bulky and is inconvenient to use.

To achieve the above object, the present disclosure provides an air compression device. The air compression device comprises a bottom shell, a top shell arranged at a top portion of the bottom shell, and a solenoid valve assembly.

A handle hole is provided on one side of the top shell. The solenoid valve assembly comprises a plurality of solenoid valves. The plurality of solenoid valves are fixedly installed on a solenoid valve air distribution bracket. A row of control air passages is disposed on a top portion of the solenoid valve air distribution bracket. The row of control air passages comprises first control air passages disposed on a middle portion of the row of control air passages and second control air passages on two sides of the row of control air passages. The first control air passages are one-to-one communicated with a first row of working air passages disposed on an upper portion of one side of the solenoid valve air distribution bracket. The second control air passages are one-to-one communicated with a second row of working air passages disposed on a lower portion of the one side of the solenoid valve air distribution bracket. The plurality of solenoid valves are one-to-one disposed on the row of control air passages. The plurality of solenoid valves control communication between the first row of working air passages or the second row of working air passages and a main air pipe.

Optionally, the row of control air passages are five control air passages arranged in a low. The five control air passages are disposed on the top portion of the solenoid valve air distribution bracket. The five control air passages comprise three first control air passages disposed on the middle portion of the five control air passages and two second control air passages on the two sides of the five control air passages. The three first control air passages are one-to-one communicated with the first row of working air passages disposed on the upper portion of the one side of the solenoid valve air distribution bracket. The two second control air passages on two ends of the five control air passages are one-to-one communicated with the second row of working air passages disposed on the lower portion of the one side of the solenoid valve air distribution bracket. The plurality of solenoid valves are one-to-one disposed on the five control air passages. The plurality of solenoid valves control communication between the first row of working air passages or the second row of working air passages and a main air pipe.

Optionally, two working air passages arranged on two sides of the first row of working air passages and the second row of working air passages are strip-shaped grooves. The strip-shaped grooves extend from a surface of the solenoid valve air distribution bracket to a middle portion of the solenoid valve air distribution bracket. Air passage guide gaskets are arranged on the surface of the solenoid valve air distribution bracket. The air passage guide gaskets cover the strip-shaped grooves. A middle position of each of the air passage guide gaskets defines an air hole.

Optionally, two pieces of the air passage guide gaskets are arranged symmetrically on a left portion and a right portion of the solenoid valve air distribution bracket.

Optionally, an air pump support bracket is fixedly installed in the bottom shell. An air pump is fixedly installed in the air pump support bracket. An air outlet of the air pump is communicated with the plurality of solenoid valves through an air pipe and a first straight pipe. The air pipe is fixedly connected with a first end of a first L-shaped air pipe through a second straight pipe. A second end of the first L-shaped air pipe is fixedly connected with a first end of a second L-shaped air pipe through a third straight pipe. A second end of the second L-shaped air pipe is fixedly connected with an air outlet of the solenoid valve air distribution bracket.

Optionally, a control printed circuit board (PCB) is fixedly installed in the bottom shell. A liquid crystal display (LCD) light guide plate is fixedly installed on a top portion of the control PCB. An LCD is fixedly installed on a top surface of the LCD light guide plate. An LCD rubber sleeve is sleeved on the LCD.

Optionally, a battery and a power supply PCB are fixedly installed in the bottom shell. The battery is electrically connected with the power supply PCB.

Optionally, an air pump buffer cotton is adhered between the air pump and the air pump support bracket.

Optionally, the air compression device further comprises an air seat. Solenoid valve sealing gaskets are disposed between the air seat and the solenoid valve sir distribution bracket.

Optionally, the air pipe is communicated with a pressure sensor disposed on the control PCB.

Compared with the prior art, the row of control air passages is disposed on the top portion of the solenoid valve air distribution bracket. The first control air passages are one-to-one communicated with the first row of working air passages disposed on the upper portion of the one side of the solenoid valve air distribution bracket. The second control air passages are one-to-one communicated with the second row of working air passages disposed on the lower portion of the one side of the solenoid valve air distribution bracket.

The plurality of solenoid valves are separately disposed on the top portion of the row of control air passages and control communication between the first row of working air passages or the second row of working air passages and the main air pipe. In the air compression device of the present disclosure, by providing two rows of working air passages on the solenoid valve air distribution bracket with a simple structure, the row of control air passages is directly communicated with the two rows of working air passages, which avoids a problem that a conventional air compression massager needs to dispose connecting pipes in a host of the conventional air compression massager, so that a size of the air compression device of the present disclosure is small and there is no problem of unsmooth airflow. Further, since the size of the air compression device of the present disclosure is smaller than that of the conventional air compression massager, the handle hole is defined on the one side of the top shell, because the device is smaller than the traditional device, the handle hole enables the air compression device to be hand-held or hung on a wall when in use.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
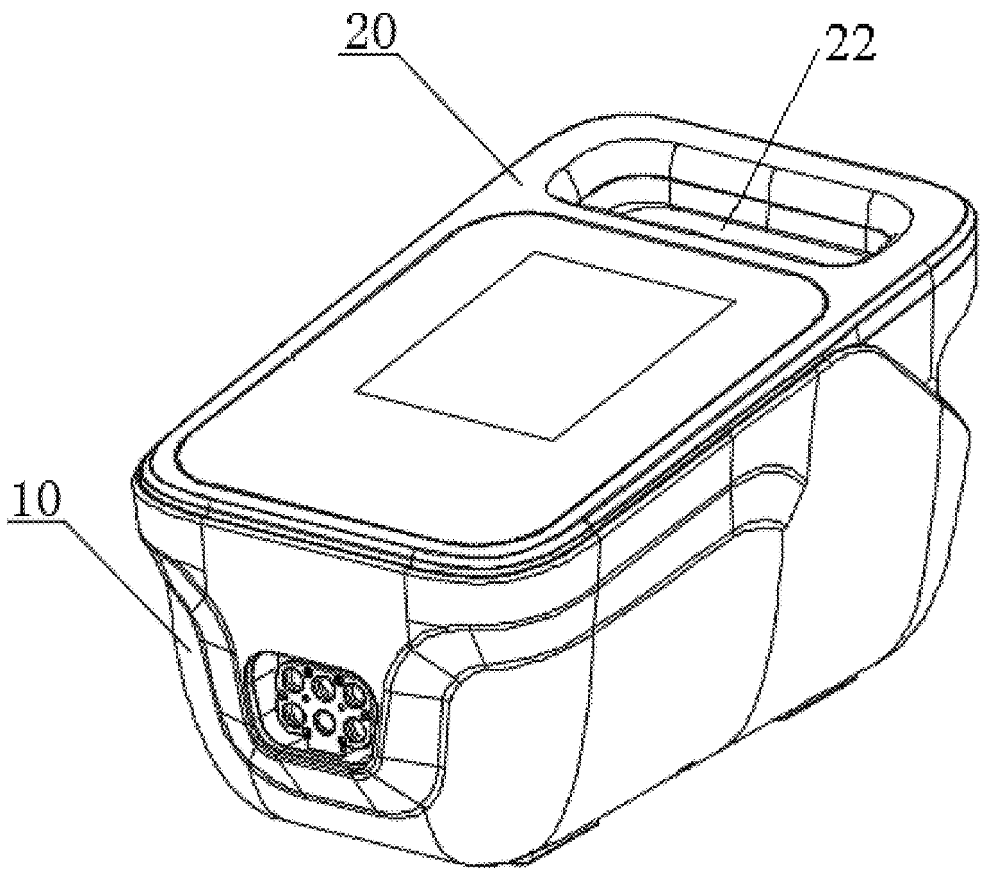
FIG. 1 is a schematic diagram of an air compression device of the present disclosure.
Figure 2:
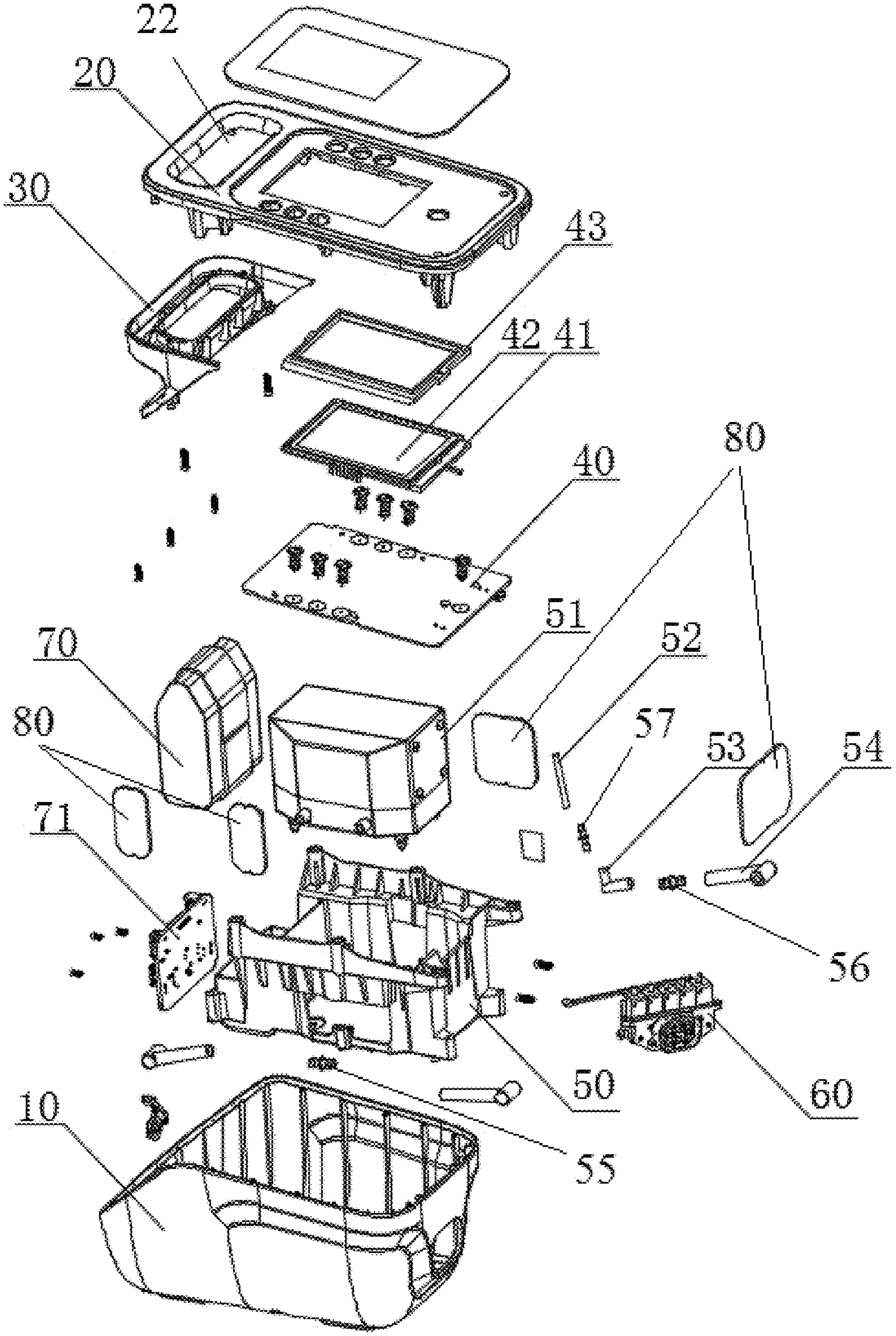
FIG. 2 is an exploded schematic diagram of the air compression device of the present disclosure.
Figure 3:
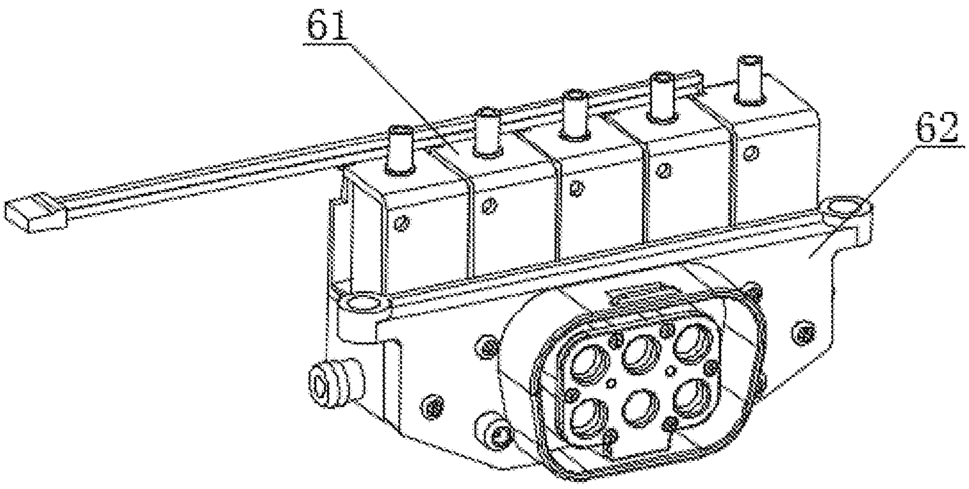
FIG. 3 is a schematic diagram of a solenoid valve assembly of the present disclosure.
Figure 4:
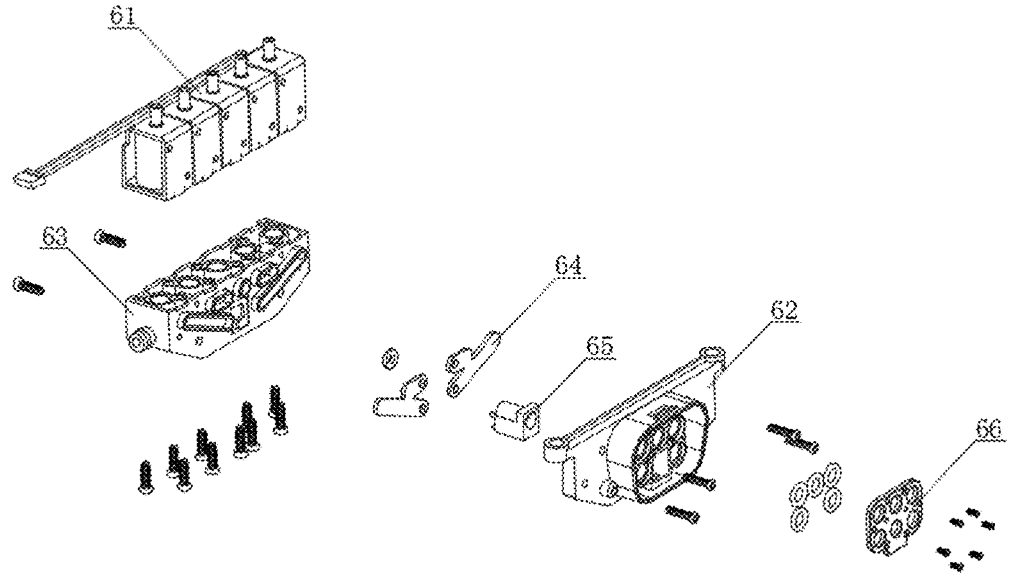
FIG. 4 is an exploded schematic diagram of the solenoid valve assembly of the present disclosure.
Figure 5:
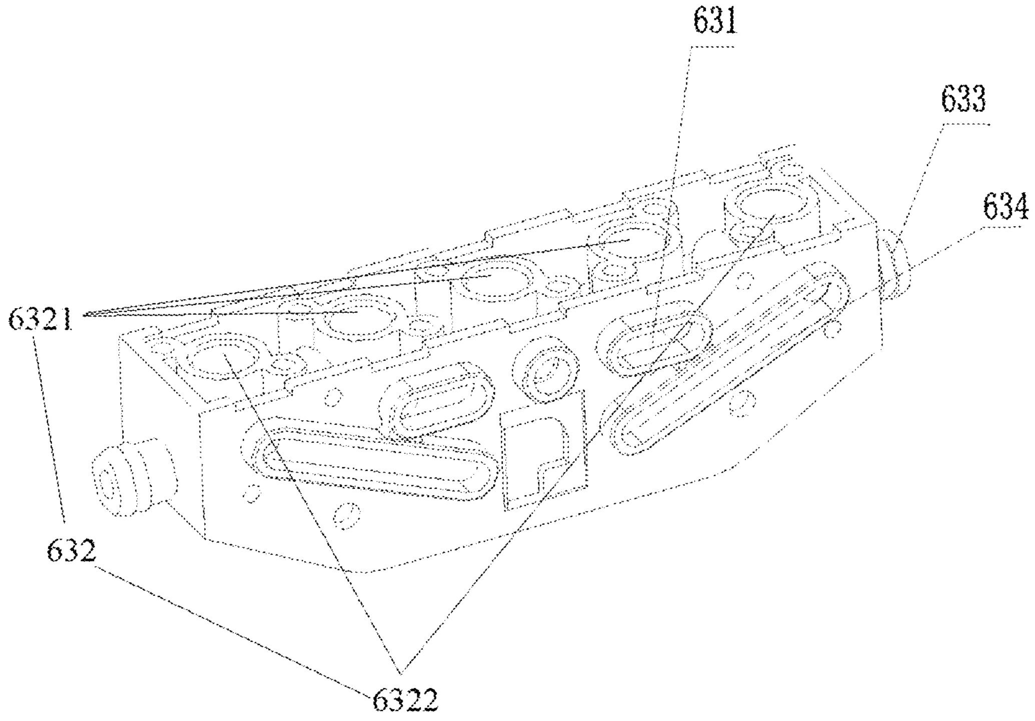
FIG. 5 is a schematic diagram of a solenoid valve air distribution bracket of the present disclosure.

As shown in FIGS. 1-5, the present disclosure provides an air compression device.

The air compression device is configured to inflate leg sleeves and comprises a bottom shell 10 and a top shell 20 arranged at a top portion of the bottom shell 10. A middle shell 30 is fixedly installed between the bottom shell 10 and the top shell 20. The middle shell 30 is fixed on the top shell 20 by screws.

A handle hole 22 is provided on one side of the top shell 20 and the middle shell 30. A solenoid valve assembly 60 is disposed in the bottom shell 10. The solenoid valve assembly comprises five solenoid valves 61. The five solenoid valves 61 are fixedly installed on a top portion of a solenoid valve air distribution bracket 63. A row of five control air passages 632 is disposed on the top portion of the solenoid valve air distribution bracket 63. The row of control air passages comprises three first control air passages 6321 disposed on a middle portion of the row of five control air passages 632 and two second control air passages 6322 on two sides of the row of five control air passages 632. The three first control air passages 6321 are one-to-one communicated with a first row of working air passages 631 disposed on an upper portion of one side of the solenoid valve air distribution bracket 63. The two second control air passages 6322 are one-to-one communicated with a second row of working air passages 634 disposed on a lower portion of the one side of the solenoid valve air distribution bracket 63. The five solenoid valves 61 are one-to-one disposed on the row of five control air passages. The five solenoid valves 61 control communication between the first row of working air passages 631 or the second row of working air passages 634 and a main air pipe 633. An air seat 62 is fixedly installed on one side of the solenoid valve air distribution bracket 63. The air seat 62 comprises five air nozzle sockets and a heating socket. A direct current (DC) socket 65 is fixedly installed in the solenoid valve air distribution bracket 63. An air seat cover 66 is fixedly installed on one end of the air seat 62.

Compared with the prior art, the row of control air passages 632 is disposed on the top portion of the solenoid valve air distribution bracket 63. The first control air passages 6321 are one-to-one communicated with the first row of working air passages 631 disposed on the upper portion of the one side of the solenoid valve air distribution bracket 63. The second control air passages 6322 are one-to-one communicated with the second row of working air passages 634 disposed on the lower portion of the one side of the solenoid valve air distribution bracket 63. The five solenoid valves 61 are separately disposed on the top portion of the row of control air passages 632 and control communication between the first row of working air passages 631 or the second row of working air passages 634 and the main air pipe 633. In the air compression device of the present disclosure, by providing two rows of working air passages on the solenoid valve air distribution bracket 63 with a simple structure, the row of control air passages is directly communicated with the two rows of working air passages, which avoids a problem that a conventional air compression massager needs to dispose connecting pipes in a host of the conventional air compression massager, so that a size of the air compression device of the present disclosure is small and there is no problem of unsmooth airflow. Further, since the size of the air compression device of the present disclosure is smaller than that of the conventional air compression massager, the handle hole 22 is defined on the one side of the top shell 20, because the air compression device of the present disclosure is smaller than the traditional device, the handle hole 22 enables the air compression device to be hand-held or hung on a wall when in use.

In one embodiment of the air compression device, as shown in FIGS. 1-5, on the basis of the previous embodiments, two working air passages arranged on two sides of the first row of working air passages 631 and the second row of working air passages 634 are strip-shaped grooves. The strip-shaped grooves extend from a surface of the solenoid valve air distribution bracket 63 to a middle portion of the solenoid valve air distribution bracket 63. Air passage guide gaskets 64 are arranged on the surface of the solenoid valve air distribution bracket. The air passage guide gaskets 64 cover the strip-shaped grooves. A middle position of each of the air passage guide gaskets 64 defines an air hole.

In one embodiment of the air compression device, as shown in FIGS. 1-5, on the basis of the previous embodiments, two pieces of the air passage guide gaskets 64 are arranged symmetrically on a left portion and a right portion of the solenoid valve air distribution bracket 63.

In one embodiment of the air compression device, as shown in FIGS. 1-5, on the basis of the previous embodiments, an air pump support bracket 50 is fixedly installed in the bottom shell 10. An air pump 51 is fixedly installed in the air pump support bracket 50. An air outlet of the air pump 51 is communicated with the five solenoid valves 61 through an air pipe 52 and a first straight pipe 55. The air pipe 52 is fixedly connected with a first end of a first L-shaped air pipe 53 through a second straight pipe 56. A second end of the first L-shaped air pipe 53 is fixedly connected with a first end of a second L-shaped air pipe 54 through a third straight pipe 57. A second end of the second L-shaped air pipe 54 is fixedly connected with an air outlet of the solenoid valve air distribution bracket 63.

In one embodiment of the air compression device, as shown in FIGS. 1-5, based on the previous embodiments, the air outlet of the air pump 51 is connected to the five solenoid valves 61 through the air pipe 52 and the first straight pipe 55. Each of the five solenoid valve 61 correspond to one air outlet. Each air outlet of corresponds to an air leg sleeve. Each of the five solenoid valves independently controls a corresponding air leg sleeve, which realizes precise control of inflatable leg sleeves.

In one embodiment of the air compression device, as shown in FIGS. 1-5, based on the previous embodiments, a control printed circuit board (PCB) 40 is fixedly installed in the bottom shell 10. The control PCB is fixed installed on the top shell 20 through screws. A liquid crystal display (LCD) light guide plate 41 is fixedly installed on a top portion of the control PCB 40. An LCD 42 is fixedly installed on a top surface of the LCD light guide plate 41. An LCD rubber sleeve 43 is sleeved on the LCD 42.

In one embodiment of the air compression device, as shown in FIGS. 1-5, based on the previous embodiments, the air pump 51 and the five solenoid valves 61 are controlled to work by the control PCB 40, so that legs are massaged by inflating and inhaling of the leg sleeves. Thus, blood circulation is promoted and formation of venous thrombosis is prevented.

In one embodiment of the air compression device, as shown in FIGS. 1-5, based on the previous embodiments, the LCD rubber sleeve 43 is fixed between the LCD 42 and the top shell 20, and plays a role of buffering and shading between the LCD 42 and the bottom shell 20.

In one embodiment of the air compression device, as shown in FIGS. 1-5, based on the previous embodiments, a battery 70 and a power supply PCB 71 are fixedly installed in the bottom shell 10. The battery 70 is electrically connected with the power supply PCB 71.

In one embodiment of the air compression device, as shown in FIGS. 1-5, based on the previous embodiments, a battery buffer cotton is attached to the battery 70, the battery buffer cotton is fixed on the air pump support bracket 50 by pre-pressing. The power supply PCB 71 is fixed on the air pump support bracket 50 by screws.

In one embodiment of the air compression device, as shown in FIGS. 1-5, based on the previous embodiments, an air pump buffer cotton 80 is adhered between the air pump and the air pump support bracket. The air pump buffer cotton 80 is configured to buffer the noise generated by vibration of the air pump 51 when it is working.

In one embodiment of the air compression device, as shown in FIGS. 1-5, on the basis of the previous embodiments, the control PCB 40 is respectively electrically connected with the LCD 42, the air pump 51, the five solenoid valves 61, the DC socket 65, and the power supply PCB 71.

In one embodiment of the air compression device, as shown in FIGS. 1-5, based on the previous embodiments, solenoid valve sealing gaskets 64 are disposed between the air seat 62 and the solenoid valve sir distribution bracket 63.

In one embodiment of the air compression device, as shown in FIGS. 1-5, based on the previous embodiments, the air pipe 52 is communicated with a pressure sensor disposed on the control PCB 40.

It should be noted that, in the present disclosure, relational terms, such as "first" and "second", are only used to distinguish one feature or operation from another feature or operation, and do not necessarily require or imply any actual relationship or sequence exists between these features or operations. Moreover, terms "comprise", "include" or any other variation thereof are intended to encompass non-exclusive inclusion, such that a process, method, article or device not only comprises elements explicitly listed, but also comprises elements not explicitly listed or other elements inherent to such a process, method, article or device.

Although the embodiments of the present disclosure have been shown and described, those of ordinary skill in the art can understand that various changes, modifications, substitutions, and variations can be made to these embodiments without departing from the principle and spirit of the present disclosure. The scope of the present disclosure is defined by the appended claims and their equivalents.

What is claimed is:

1. An air compression device, comprising:

a bottom shell;

a top shell arranged at a top portion of the bottom shell; and a solenoid valve assembly;

wherein a handle hole is provided on one side of the top shell; the solenoid valve assembly comprises a plurality of solenoid valves; the plurality of solenoid valves are fixedly installed on a solenoid valve air distribution bracket; a row of control air passages is disposed on a top portion of the solenoid valve air distribution bracket; the row of control air passages comprises first control air passages disposed on a middle portion of the row of control air passages and second control air passages on two sides of the row of control air passages; the first control air passages are one-to-one communicated with a first row of working air passages disposed on an upper portion of one side of the solenoid valve air distribution bracket; the second control air passages are one-to-one communicated with a second row of working air passages disposed on a lower portion of the one side of the solenoid valve air distribution bracket; the plurality of solenoid valves are one-to-one disposed on the row of control air passages; the plurality of solenoid valves control communication between the first row of working air passages or the second row of working air passages and a main air pipe, the row of control air passages are five control air passages arranged in a row; the five control air passages are disposed on the top portion of the solenoid valve air distribution bracket; the five control air passages comprise three first control air passages disposed on the middle portion of the five control air passages and two second control air passages on the two sides of the five control air passages; the three first control air passages are one-to-one communicated with the first row of working air passages disposed on the upper portion of the one side of the solenoid valve air distribution bracket; the two second control air passages on two ends of the five control air passages are one-to-one communicated with the second row of working air passages disposed on the lower portion of the one side of the solenoid valve air distribution bracket; the plurality of solenoid valves are one-to-one disposed on the five control air passages; the plurality of solenoid valves control communication between the first row of working air passages or the second row of working air passages and a main air pipe.

2. The air compression device according to claim 1, wherein two working air passages arranged on two sides of the first row of working air passages and the second row of working air passages are strip-shaped grooves; the strip-shaped grooves extend from a surface of the solenoid valve air distribution bracket to a middle portion of the solenoid valve air distribution bracket; air passage guide gaskets are arranged on the surface of the solenoid valve air distribution bracket; the air passage guide gaskets cover the strip-shaped grooves; a middle position of each of the air passage guide gaskets defines an air hole.

3. The air compression device according to claim 2, wherein two pieces of the air passage guide gaskets are arranged symmetrically on a left portion and a right portion of the solenoid valve air distribution bracket.

4. The air compression device according to claim 1, wherein an air pump support bracket is fixedly installed in the bottom shell; an air pump is fixedly installed in the air pump support bracket; an air outlet of the air pump is communicated with the plurality of solenoid valves through an air pipe and a first straight pipe; the air pipe is fixedly connected with a first end of a first L-shaped air pipe through a second straight pipe; a second end of the first L-shaped air pipe is fixedly connected with a first end of a second L-shaped air pipe through a third straight pipe, a second end of the second L-shaped air pipe is fixedly connected with an air outlet of the solenoid valve air distribution bracket.

5. The air compression device according to claim 1, wherein a control printed circuit board (PCB) is fixedly installed in the bottom shell; a liquid crystal display (LCD) light guide plate is fixedly installed on a top portion of the control PCB; an LCD is fixedly installed on a top surface of the LCD light guide plate; an LCD rubber sleeve is sleeved on the LCD.

6. The air compression device according to claim 1, wherein a battery and a power supply PCB are fixedly installed in the bottom shell; the battery is electrically connected with the power supply PCB.

7. The air compression device according to claim 4, wherein an air pump buffer cotton is adhered between the air pump and the air pump support bracket.

8. The air compression device according to claim 1, wherein the air compression device further comprises an air seat; solenoid valve sealing gaskets are disposed between the air seat and the solenoid valve air distribution bracket.

9. The air compression device according to claim 4, wherein the air pipe is communicated with a pressure sensor disposed on a control PCB.

* * * * *